Patented May 31, 1949

2,471,790

UNITED STATES PATENT OFFICE 2,471,790

INSECT-AFFECTING COMPOSITIONS

Frank J. Sowa, Cranford, N. J., and Arthur Schwerdle, New York, N. Y.; said Schwerdle assignor to said Sowa No Drawing. Application April 26, 1945, Serial No. 590,500

14 Claims. (Cl. 167—30)

This invention relates to insect-affecting compositions and to correlated improvements designed to enhance their use and effectiveness.

More particularly, the present invention relates to compositions containing at least one insect repellent and/or insecticide and a functionally important carrier. It has been found that many compounds which have been considered solely as insecticides also function as an insect repellent, and many insect repellents are also insecticides. The mono- and di-esters (including the mixed esters) of the endo-compounds disclosed in our parent application, Serial No. 578,548, filed February 17, 1945, and now abandoned are bi-functional in this manner. In view thereof, the term "insectaffect" has been suggested as a generic term for any substance or composition which affects insects either as an insecticide and a repellent, and this term will be used in this generic manner in the present specification.

It has been discovered that the "insectaffect" characteristics of the mono- and di-esters of our parent application are greatly improved and altered by using them in admixture with a carrier. Therefore, the present invention has for its general object the provision of a composition which has greater effectiveness and a wider field of use than the pure mono- and di-esters described and claimed in our parent application.

A specific object of the invention is to provide a composition which is effective for long periods of time, is non-toxic to human beings, relatively low in cost and which, preferably, both repels and kills insects.

Other objects will in part be obvious and will in part appear hereinafter.

According to the present invention, there are provided compositions having novel insect-affecting characteristics comprising a functional carrier and an ester having the following general formula:

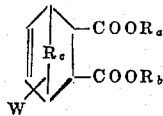

in which the carbons 1 and 4 are joined through a bridge in which $R_c$ represents —C—, —COC—

and —O—, and in which the remaining valences (if any) of the carbon atoms are occupied by hydrogen or alkyl groups, and in which W represents hydrogen, halogen, thiocyanate, hydroxyl, OR, COOR, COR, and COH, and in which $R_a$ represents an alkyl group, and $R_b$ represents hydrogen, an alkali or alkaline earth metal or an alkyl group. The ester group COOR may be united directly to the ring carbons or indirectly through a carbon of an alkyl group, as in —CH$_2$—COOR. The ester groups may be the same or different. In the following specification and in the claims the term "di ester" is used to include those di-esters in which the ester groups are the same or different and thus includes the mixed esters.

Preparation of the esters

The esters are prepared, as described in our parent application above identified, by the addition of conjugated alicyclic (homocyclic) dienes or oxygen-heterocyclic dienes and their halogen substitution products to 1,2 unsaturated dicarboxylic acid anhydrides according to the Diels-Adler reaction, and thereafter converting them into the mono- or di-esters by known esterification procedures. By way of illustration only, the preparation of the ester from a conjugated alicyclic diene will be given. The conjugated diene is caused to add, by the Diels-Adler reaction, to an 1,2 unsaturated 1,2 dicarboxylic acid anhydride, as follows:

The following are examples of suitable homocyclic dienes: cyclopentadiene-1,3; 1,1,2-trimethyl cyclopentadiene-1,3; cyclohexadiene-1,3; 1,3,5,5-tetramethyl cyclohexadiene-1,3; and the following will be given as examples of suitable oxygen-heterocyclic dienes: furan, cumalin, 2 methyl cumalin, sylvan (2 methyl furan) and the like. Suitable anhydrides are those in which the carbonyl groups are on adjacent carbon atoms and the double bond exists between these atoms. The halogen substitution products of such anhydrides may also be employed; for example, anhydrides of maleic, citraconic, mesaconic acids and the like, and dichloro maleic acid, dibromo citraconic acid, bromo mesaconic acid and the like. The addition reaction may be initiated by heating, temperatures up to 200° C. being suitable, and the reaction may be carried out in a closed vessel under pressure with advantage. If necessary the reaction may be carried out in an inert liquid vehicle or medium.

The esterification of the resulting acid anhydride takes place according to the following type reaction:

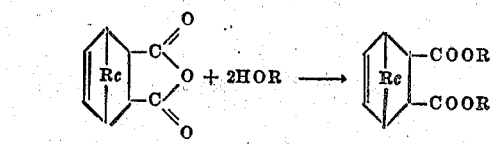

The esterification reaction can be carried out in several ways, such as (1) by hydrolysing the anhydride and reacting the resulting acid with an alcohol; (2) by dissolving or suspending the anhydride in the appropriate alcohol and passing in dry hydrogen chloride gas; (3) by converting the acid into an acid chloride and then reacting the acid chloride with an alcohol.

In the esterification reactions the alcohols as a class may be used and the alcohol is selected with respect to the ester desired.

It has now been found that the temperature of esterification and of purification must be carefully controlled, otherwise a decomposition occurs giving a compound which is extremely irriating to the human skin. Without limiting the invention by any theoretical explanation, the decomposition reaction is now believed to be in effect, a reversal of the Diels-Adler reaction with the splitting of the di-ester into (a) the original conjugated diene and (b) an unsaturated dicarboxylic acid ester, according to the following reaction:

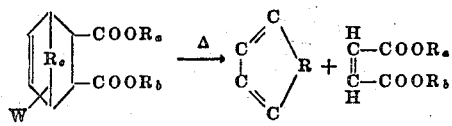

Therefore, it has been found that the temperature of esterification and purification of the ester should not be allowed to rise above about 145° C., preferably not above 140° C.

The di-ester appears to be decomposed to form the diene and an unsaturated ester, the latter being irritating to the human skin. This decomposition reaction appears to take place during the esterification or during the distillation of the excess alcohol or the distillation of the pure ester, the decomposition of the ester being substantial and rapid above about 145° C. and appears to be complete for the di-methyl ester at between 200°–250° C. Thus, to avoid the production of the irritating product, the esterification is carried out at a temperature below 145° C. preferably below 100° C.

General properties of the esters

In general the mono- and di-esters used in the present compositions are characterized by being insoluble in water but soluble in aliphatic alcohols, ketones, esters and aliphatic and aromatic hydrocarbons. However, some of the acid mono-esters are soluble in water and aqueous alkaline solutions. The sodium compounds of the sulphonated esters are also, in general, soluble in water. In the preferred embodiment there are employed the esters which have a boiling point below 250° C. and which exhibit a high vapor pressure at atmospheric temperatures of from 15 to 30° C. The esters used in the present invention are new as compounds per se, that is, they have not been produced heretofore and therefore their novel insect-affecting properties have not been known or suspected. The surprising discovery has been made that the esters used in the present invention are miscible with many of the natural or synthetic insect repellents and insecticides heretofore known. Thus, the present insect-affects may be used as liquid extracting agents to extract pyrethrum, rotenone, derris, nicotine (after addition of lime) and other insecticides from vegetable matter in which they occur.

We have also found that those di-esters which contain a total of from 2 to 8 carbon atoms in the ester radicals are the most effective compounds (considering both radicals together). The carbon atoms may be distributed in any manner between the two ester radicals which permits numerous permutations such, for example, as methylbutyl, ethylbutyl, ethyl propyl, methyl propyl, dipropyl and diethyl. The most effective compound in knockdown and kill of insects was found to be the methyl propyl ester of bicycloheptene 2,3 dicarboxylic acid. Another diester of high effectiveness is the "homo" derivative of the following formula:

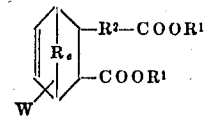

in which $R^2$ represents $C_nH_{2n}$, and $R^1$ are alkyl groups, the same or different, which compounds can be made by the Diels-Adler reaction or by oxidation of dicyclopentadiene and esterifying the acid thus produced.

In general the present invention provides the following types of insect-affecting compositions:

1. Comprising one or more of the esters and a carrier, either solid, liquid or gaseous;
2. Comprising one or more of the esters in admixture with another insect repellent and/or insecticide, and a carrier.
3. More specifically: a composition as in 2 in which the other insect repellent or insecticide acts as the carrier for the present ester.

Preparation of the space spray

When a liquid composition is desired, the insectifuge compound alone or in admixture with other insectifuges or insecticides, is dissolved in a volatile carrier which may be (a) aqueous or (b) non-aqueous organic solvent, or (c) it may be dispersed in an emulsion by use of suitable emulsifying agents. In addition, a wetting agent may be employed in the solution, colloidal dispersions, or emulsions to assist the contact and spreading of the insectifuge.

In general, the carrier or vehicle may be solid, liquid or gaseous and when it is a liquid, the liquid may be aqueous or organic. Suitable vehicles are water and aqueous solutions of the aliphatic alcohols, mono-alkyl ethers of ethylene glycol, acetone, and triethanolamine and the like. The water-insoluble esters may be dispersed in an aqueous vehicle by use of an emulsifying agent. The common emulsifying agents such as glycerol mono-oleate, amine salts, sulfated and sulfonated fatty acids and alcohols, and mineral oils, soaps, and the like may be used. On the other hand, when the compounds are soluble in organic solvents, a suitable organic solvent may be employed such, for example, as alcohols, esters, benzene, toluene, methyl chloride and halogenated hydrocarbons, kerosene and the like.

In a preferred embodiment the esters are added to a gaseous vehicle comprising any low-boiling liquid or gaseous substances, such, for example, as carbon-dioxide, difluorodichloro methane, sulfur dioxide, propane, methyl chloride and the like.

Thus, the present invention provides in one embodiment a novel space spray composition comprising the insect repelling esters dispersed in a liquid or gaseous carrier preferably a liquid of very low-boiling point, so that the composition is capable of being sprayed into the atmosphere at room temperature. The gaseous dispersion thus produced by spraying is very effective for large enclosed areas.

The invention also contemplates the use of compositions containing the present esters in combination with solid carriers. The solid carriers may be selected from the group consisting of solid insecticides, solid fungicides and solid fertilizers. Among the solid insecticides there may be mentioned sodium fluoride, sodium fluosilicate, cryolite, Paris green, calcium arsenate, lead arsenate, naphthalene, rotenone, pyrethrum, nicotine and the like. Among the solid fungicides there may be mentioned lime sulfur, 2,3-dichloro 1,4-naphthoquinone, ferric dimethyl dithiocarbamate, Bordeaux mixture and the like. Among the solid fertilizers there may be mentioned ammonium sulfate, ammonium phosphate, ammonium nitrate, potassium sulfate, dicalcium phosphate, sodium nitrate, bonemeal, limestone and the like.

Thus, a plant spray may comprise finely ground sodium fluosilicate carrying on its surface a deposit of one of the present esters. This composition would be effective against termites, ants, flies and other insects and would be particularly beneficial for use around the base of dwellings. An effective plant spray would comprise, for example, a mixture of calcium arsenate and one of the present esters. This would be effective against chewing insects as well as against flies, aphids and other insects. An effective fungicide composition for fabrics, particularly wearing apparel, is a mixture of 2,3-dichloro 1,4-naphthoquinone together with one of the esters of the present invention. An effective fertilizing and insect-affecting composition comprises bonemeal admixed with one of the present insecticides. The bonemeal would serve as a carrier and help to distribute the esters uniformly over a large area of ground. It is understood that in addition to the present esters there may be used other insecticides. The sulphur also serves to dilute the ester so that it does not cause damage to the foliage of the plants by its dehydrating or oxygen-excluding action. Another effective composition for plants which are subject to attack by aphids comprises a major proportion of ground tobacco (containing nicotine) carrying up to 10% of one of the esters of the classes herein described. It will be noted that the invention thus provides a composition comprising (a) one or more of the present esters and (b) an active solid carrier which is itself an insecticide.

*Compositions containing two or more active ingredients*

The insectifugal esters of the present invention may be used in admixture with each other or with other known insectifuges, such for example, as citronella, 2-ethyl hexanediol, aromatic hydrocarbons, halogenated hydrocarbons, alkyl phthalates, dihydroxy hexane, alpha, alpha dimethyl alpha carbobutoxy dihydro gamma pyrone ("Indalone"), and the like. In addition, they may be used with insecticides such, for example, as organic isothiocyanates, pyrethrum, rotenone, derris, nicotine, phenothiazine, pp'-dichloro diphenyl trichlorethane, called "DDT," and the like, and also with fumigants such as hydrocyanic acid, carbon disulfide, methyl bromide, chloropicrin and the like.

The esters of the present invention are miscible with many of the natural or synthetic insecticides heretofore known. Thus, the present insectifuges may be used as liquid extracting agents to extract pyrethrum, rotenone, derris, nicotine (after addition of lime) and other insecticides from vegetable matter in which they occur.

The surprising discovery has now been made that the compatible mixtures of the present insectifugal esters with known insect repellents and insecticides exhibit a remarkable synergesis, that is, the composition containing the two ingredients is more effective than the sum total of each of the separate ingredients. In other words, the present insectifuges seem to increase the effectiveness of known insectifuges and insecticides.

The following table shows the killing time of the present compound used alone and in a mixture with "DDT":

| | Compound | Killing Time for Flies |
|---|---|---|
| | | Minutes |
| 1 | "DDT" used alone | 30 |
| 2 | Di-methyl ester of bicyclo (2,2,1) heptene dicarboxylic acid | 60 |
| 3 | Mixture of equal parts of 1 and 2 | 20 |

In addition to the synergesis, the use of the combination of the present insectifugal esters with known insectifuges which are miscible therewith has an added advantage in that the mixture has a substantially lower crystallization point than the pure compound. Thus, the mixture can be used in colder climates than the pure compound without crystallization on the skin.

*Example I*

980 grams of maleic anhydride is dissolved in 500 cc. of benzene by warming to 35° C., and there is added 800 grams of freshly distilled cyclopentadiene while the mixture is agitated. The reaction is exothermic; therefore, the mixture is kept under a reflux condenser, and, if desired, the reaction mixture is cooled to permit a more rapid reaction. When all the cyclopentadiene has been added and the solution is complete, the reaction mixture is poured into a chilled vessel and allowed to crystallize by cooling. The crystallized product is filtered off and dried. The product is bicyclo (2,2,1) heptane-5 dicarboxylic acid-2,3 anhydride, melting point 164° C., and the formula is:

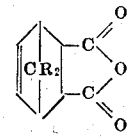

*Example II*

The following will be given as an example of the preparation of the anhydride from an oxygen hetrocyclic diene:

Furan 34 grams, maleic anhydride 48 grams are mixed with 100 cc. of ethyl ether and shaken with slight warming not above 30° C. on a heating mantle. After complete solution, the solution was allowed to stand for 24 hours, whereupon the endo oxa tetrahydro phthalic anhydride separated as a white crystalline substance having a melting point of between 120° C. and 125° C.

The corresponding acid ester, di-ester, and chlorinated ester of the anhydrides prepared according to Examples I and II exhibit very pronounced insect-repelling characteristics, and when the esters were prepared at temperatures above 145° C., the compounds are non-irritating to the human skin.

Examples showing the preparation of the different esters will be given below:

It is to be understood that in the following examples the temperatures during esterification or during subsequent purification should be carefully maintained below 145° C.

Example III

The mono-ester can be prepared as follows:

A mixture of 2.5 pounds of the anhydride obtained according to Example I supra, and 2.5 pounds of methanol was refluxed, in the absence of a catalyst, at a temperature of about 70° C. for 30 hours. In the absence of an acid catalyst, the mono-methyl ester, that is, the acid ester, only is formed. The reaction mixture was diluted with water, whereupon the acid ester crystallized out and was filtered and dried.

Example IV

The following will be given as an example of the preparation of a di-ester:

2.5 pounds of the anhydride (produced according to Example I), 2.5 pounds of ethanol, and 2 ounces of sulfuric acid are mixed together and warmed to about 30° C. for 2 hours, and then refluxed for 8 hours at a temperature not above 70° C. at atmospheric pressures. After this time there is added 100 grams of sodium bicarbonate. The ethyl alcohol is distilled off at a temperature not above 110° C. (pot temperature), after which a liter of water is added, and solid sodium bicarbonate stirred in until the solution is neutral. The wet di-ethyl ester is separated, washed again with water and dried under vacuum at a temperature below 145° C. and, finally, purified by filtering it through carbon black or diatomaceous earth. Instead of purifying the product by filtration, a modification of this example comprises a final distillation of the separated di-ethyl ester, the distillation being carried out at a temperature below 145° C., for example, by reducing the pressure to 14 mm. The pure di-ethyl ester thus obtained is non-irritating to the human skin and exhibits a very high efficiency as an insect repellent. An efficient insect repelling composition is obtained by dissolving the di-ester in isopropyl alcohol, toluene, benzene, or other solvent.

Example V

The following illustrates the preparation of a mixed ester, i. e. one having different ester radicals:

196 grams of the methyl acid ester as prepared in Example III is mixed with 175 grams of propyl alcohol, 100 grams benzene, and 10 grams sulfuric acid, and the mixture is heated under reflux (with water takeoff by azeotrope) at a temperature of 110° C. until no more water is distilled off (about 6 hours). The reaction product is neutralized with aqueous sodium bicarbonate solution. The benzene is distilled off, the residue washed and dried under vacuum. A clear yellow liquid (methyl, propyl ester) having strong insect-repelling properties is obtained. When dissolved in acetone as a carrier, the efficiency is greatly improved.

Example VI

An unsaturated ester was prepared as follows:

322 grams of the anhydride made in Example I are mixed with 408 grams allyl alcohol and 66 grams sulfuric acid. The mixture was warmed to 40° C., allowed to stand overnight, and then washed several times with water and finally neutralized. The product was again washed and the water and residual allyl alcohol removed by distillation at reduced pressure below 140° C. The residue was an amber liquid strongly insectifugal but not irritating to the human skin. It was dissolved in mono-methyl ether of ethylene glycol to form an effective fly spray.

Example VII

Halogenated esters may be prepared in the following manner:

A mixture of 3 moles of ethylene chlorhydrin, 1 mole of the anhydride (of Example II), and ⅓ mole sulfuric acid is warmed to 40° C. and allowed to remain at room temperature until a clear solution resulted. The product was washed repeatedly with water and dilute sodium bicarbonate solution until all the excess chlorhydrin had been extracted and the acid neutralized. Finally, the remaining water was removed by vacuum at about 100° C. The product was filtered to give a viscous yellow liquid which was dissolved in a chlorinated hydrocarbon to give an excellent insect spray.

By way of further illustrating but not by way of limiting the invention, there will be given the following additional examples of compositions to show their relative efficiencies. In each case the ester used was the di-ester of the following compound:

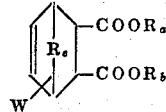

hereinafter designated "I," and the test was made on flies confined in a chamber. In each case the carrier was deodorized kerosene.

| Examples of Compositions | Per Cent Knock down after 10 minutes | Per Cent Kill after 24 hours |
|---|---|---|
| 5% dimethyl ester of I | 52 | 33 |
| 15% diethyl ester of I | 98 | 30 |
| 15% diallyl ester of I | 90 | 40 |
| 15% methyl propyl ester of I | 100 | 78 |
| 15% diethyl dihydro derivative of I | 97 | 89 |
| 15% methyl ethyl ester of I | 68 | 56 |
| 15% ethyl isopropyl ester of I | 93 | 74 |
| 1a. 100% dimethyl phthalate | 11 | |
| 1b. a mixture of 5% dimethyl phthalate and 95% dimethyl ester of I | 100 | 57 |
| 2a. 100% 1,1,-dimethyl 1,2-dihydro 5-butacarboxyl gamma pyrone | 11 | |
| 2b. a mixture of 50% "Indalone" (2a) and 50% dimethyl ester of I | 76 | 50 |
| 3a. 5% p,p'-dichloro diphenyl trichloro ethane (called "DDT") | 40 | 30 |
| 3b. a mixture of 5% DDT and 5% dimethyl ester of I | 100 | 93 |

From the above table it is apparent that the compositions of the present invention have a higher efficiency than prior compositions, and that when the present esters are mixed with known insecticides and insect repellents the total effectiveness is greater than the sum of the individual components. As previously pointed out there is also an increase in efficiency resulting in a shortening of the time required to kill the same number of insects.

Having described our invention, what we claim as new and desire to secure by Letters Patent is:

1. An insect-affecting composition comprising a liquid preparation containing the dimethyl ester of bicyclo (2,2,1) heptane-5 dicarboxylic acid-2, 3 and at least one insect-affecting composition of the contact paralysis type selected from the group consisting of dimethyl phthalate; 1,1,-dimethyl 1, 2-dihydro 5-butacarboxyl gamma pyrone; and p,p'-dichloro diphenyl trichloro ethane.

2. An insect-affecting composition comprising a liquid preparation containing the dimethyl ester of bicyclo (2,2,1) heptane-5 dicarboxylic acid-2, 3 and dimethyl phthalate.

3. An insect-affecting composition comprising a liquid preparation containing the dimethyl ester of bicyclo (2,2,1) heptane-5 dicarboxylic acid-2,3 and 1, 1,-dimethyl 1,2-dihydro 5-butcarboxyl gamma pyrone.

4. An insect-affecting composition comprising a liquid preparation containing the dimethyl ester of bicyclo (2,2,1) heptane-5 dicarboxylic acid-2,3 and p,p'-dichloro diphenyl trichloro ethane.

5. An insect-affecting composition comprising a solution containing approximately five parts by weight of the dimethyl ester of bicyclo (2,2,1) heptane-5 dicarboxylic acid-2,3 and approximately five parts by weight of p,p'dichloro diphenyl trichloro ethane dissolved in one hundred parts by weight of kerosene.

6. An insect-affecting composition comprising a compound having the following general formula

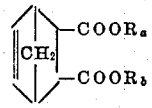

in which $R_a$ and $R_b$ are alkyl groups, the total number of carbon atoms in both groups together being from 2 to 8, together with at least one insect-affecting composition of the contact paralysis type selected from the group consisting of dimethylphthalate; 1,1,-dimethyl 1, 2-dihydro 5-butacarboxyl gamma pyrone; and p,p'-dichloro diphenyl trichloro ethane.

7. A composition as defined by claim 6 in which the compound is admixed with a carrier.

8. A composition as defined by claim 6 in which the compound is admixed with a liquid carrier.

9. A composition as defined by claim 6 in which the compound is admixed with a gaseous carrier.

10. A composition as defined by claim 6 in which the compound is admixed with a solid carrier.

11. A composition as defined by claim 6 in which $R_a$ and $R_b$ are identical alkyl groups.

12. A composition as defined by claim 6 in which $R_a$ and $R_b$ are different alkyl groups.

13. A composition as defined by claim 6 in which $R_a$ is a methyl group and $R_b$ is another alkyl group.

14. A composition as defined by claim 6 in which $R_a$ and $R_b$ are both methyl groups.

FRANK J. SOWA.
ARTHUR SCHWERDLE.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 2,237,356 | Merrill | Apr. 8, 1941 |
| 2,311,260 | Staff | Feb. 16, 1943 |
| 2,314,846 | McClellan et al. | Mar. 23, 1943 |
| 2,356,801 | Travis | Aug. 29, 1944 |

FOREIGN PATENTS

| Number | Country | Date |
|---|---|---|
| 547,874 | Great Britain | Sept. 15, 1942 |

OTHER REFERENCES

Contributions Boyce Thompson Institute, vol. 14, Oct.-Nov. 1946, pages 341-348, by Prill et al.